United States Patent [19]
Riner et al.

[11] Patent Number: 4,640,989
[45] Date of Patent: Feb. 3, 1987

[54] COMMUNICATIONS UNIT FOR EXECUTIVE WORK STATION

[75] Inventors: Wilbur L. Riner, Roswell; Bruce W. Watson, Norcross, both of Ga.

[73] Assignee: Asher Technologies, Inc., Roswell, Ga.

[21] Appl. No.: 633,538

[22] Filed: Jul. 23, 1984

[51] Int. Cl.[4] .......................................... H04M 11/00
[52] U.S. Cl. ....................................... 379/94; 379/96; 379/361; 379/386
[58] Field of Search ............... 179/2 C, 2 DP, 90 BD, 179/90 BB; 375/5, 8

[56] References Cited

U.S. PATENT DOCUMENTS

| | | | |
|---|---|---|---|
| 3,803,360 | 4/1974 | Morstadt | 179/2 DP |
| 3,885,108 | 5/1975 | Zock | 179/2 DP X |
| 3,889,062 | 6/1975 | Epstein | 179/2 DP |
| 4,051,326 | 9/1977 | Badagnani et al. | 179/2 DP |
| 4,201,887 | 5/1980 | Burns | 179/2 DP |
| 4,253,157 | 2/1981 | Kirschner et al. | 179/2 DP X |
| 4,367,374 | 1/1983 | Serrano | 179/2 C |
| 4,403,111 | 9/1983 | Kelly | 179/2 DP X |
| 4,518,823 | 5/1985 | Kessler | 179/2 DP |
| 4,524,244 | 6/1985 | Faggin et al. | 179/2 DP |
| 4,559,416 | 12/1985 | Theis et al. | |

FOREIGN PATENT DOCUMENTS

| | | | |
|---|---|---|---|
| 33821 | 8/1981 | European Pat. Off. | 179/2 DP |

OTHER PUBLICATIONS

MFJ Enterprises, Inc., advertisement for VIC-20/C-64 Modem, *Run*, Mar. 1984, p. 35.
Richvale Telecommunications, advertisement, "Developing a Mind for the Future", *Compute's Gazette*, May 1984, p. 45.
Eriksson et al, "Voice and Data Workstations and Services in the ISDN", *Ericsson Review*, vol. 61, No. ISDN, May 1984, pp. 14-19.
BIZCOMP, Advertisement "There's Only One PC/XT Modem Designed to Let Both You and Your Computer Talk,".

*Primary Examiner*—Keith E. George
*Attorney, Agent, or Firm*—Oltman and Flynn

[57] ABSTRACT

A communications unit for an executive workstation which provides a switching arrangement for interconnecting voice and data lines with a computer and a telephone instrument. The communications unit contains a microcomputer with memory which provides connection patterns and number directory for quick access to individuals and data services required by the user. In the preferred embodiment, the communications unit is configured as a printed circuit board that may be plugged into a desktop computer for direct access to the computer's keyboard and CRT monitor so that the user may use the keyboard and the monitor for all communications. The communications unit also is capable of connecting to a keysystem.

9 Claims, 5 Drawing Figures

COMMUNICATIONS UNIT FOR EXECUTIVE WORK STATION

BACKGROUND

The invention relates to communication units for use with small computers, and more particularly for use with a desk top computer of the now widely used type having a data base suitable for administrative or business type applications.

Small computers of the desktop type are increasingly finding use as so-called executive work stations. In this type of application several different modes of operation for a small computer may be invoked by the user depending upon his particular needs.

In one such mode, the desktop computer may be used to present different data families organized in a form that has the greatest degree of utility for the user. Typical of such type of data families is inventory data, personnel data, financial data and so forth.

In another mode of operation, such desktop computers may be coupled to voice and data communication lines with suitable switching arrangements for the purpose of setting-up voice and data connections to other individuals and for setting-up conferences with groups of individuals.

In still another mode of operation the desktop computer may be provided with suitable data-switching arrangements for connecting with data bases or message storage memory bases for retrieval and deposit of messages.

In the hereinabove described modes of use it has been found that a relatively small computer provided with suitable programming and connected via suitable switching arrangements for voice and data lines can be programmed to dial-up almost any desired patterns of connections that may be stored in the computer's user-accessible memory. Furthermore, the computer can be programmed in advance to overcome almost any types of problems normally encountered in the setting up of such communications patterns, such as busy or unavailability conditions and the like.

SUMMARY AND PRIOR ART

Inventors have in recent years sought to combine the versatility of the desktop computer with switching and communications facilities for providing an executive work facility ("work station").

U.S. Pat. No. 3,887,062 discloses a digital computer having terminals such as teleprinter, keyboard and acoustic couplers for connection with telephone lines.

U.S. Pat. No. 4,0151,326 discloses an arrangement for switching-on and initialization of a data terminal.

U.S. Pat. No. 4,201,887 discloses a data communications terminal that provides a handheld automatic tone-dialling arrangement, comprising a microprocessor with a memory and a keyboard.

U.S. Pat. No. 4,253,157 discloses a data access system for providing data bank access to a subscriber terminal via telephone lines.

U.S. Pat. No. 4,367,374 discloses a modem telephone interface circuit for interfacing between a telephone line and a telephone instrument and a data terminal.

U.S. Pat. No. 4,403,111 discloses apparatus for interconnecting data communications equipment and data terminal equipment.

The communications circuit of the present invention provides a communications unit for interfacing between voice and data lines that is highly adapted for close association, electrically and physically, with a desktop type computer, and which provides the means for connection with such lines and for controlling them in accordance with the particular type line control protocol required for the lines. The communications unit further provides access to a conventional telephone instrument for voice and tone communication with the voice lines.

In the preferred embodiment of the invention, the communications unit is also adapted for communication with internal switching systems such as PABX systems and Keytelephone systems. Such switching systems usually have a line control protocol which is different from that required for control of central office telephone lines.

In the preferred embodiment the communications unit is closely associated, physically, with a desktop computer in that it is assembled and wired on a circuit board of such a type that can be plugged directly into a prepared "slot" in the circuit board "card-cage" that holds the circuit boards constituting the desktop computer's other circuits. In that way the communications unit may be tied directly into the computer's backplane wiring and receive its electric power directly from the computer's power supply and be wired directly to the computer's internal control busses, if such should be found desirable.

By being closely integrated with a desktop computer, the communications unit may be arranged to use the computer's already existing keyboard and display screen (CRT) so that the expense of providing these items separately for the communications system can be spared. As an example, if the communications unit is connected to a keytelephone system, the status of the lines, such as free, busy, holding or ringing may be shown on the CRT screen in a readily recognizable display, and the control of these lines, instead of requiring separate control keys, can be undertaken by means of the computer's already existing keyboard.

The communications unit according to the instant invention further consists of switching elements—in this disclosure designated "crosspoints"—for providing a flexible, selective association between the voice and data lines, a voice telephone, the computer and the line protocol control circuit. These crosspoints are directly controllable by the computer and therefore also comprise holding latch circuits that can be set or reset by the input-output bus (I/O Bus) of the computer.

The communications unit may further comprise internal controls consisting of a small microprocessor with associated control memory containing a control program for the functions dedicated to the communications unit and memory associated therewith for storing frequently used numbers, connection patterns and protocols desired by the user.

The communications unit may further comprise a so-called modem (modulator-demodulator) which is a conventional circuit adapted for data interfacing between a computer and voice and data lines. Such modems are commercially available in different forms, but all serve to convert computer generated data strings into a data format that can be directly transmitted over data lines. In the herein contemplated application, data modems of the type that operate on the principle of frequency-shift (FSK) modulation have been found to be well suited. Such FSK modems are available from different manufacturers such as Motorola, Inc., under type number MC 14412 and others, in the form of single integrated circuits ("chips").

Other objects of this invention will appear from the following description and appended claims, reference being had to the accompanying drawings forming a part of this specification wherein like reference characters designate corresponding parts in the several views.

DESCRIPTION OF THE PREFERRED EMBODIMENT

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

Figure 1:
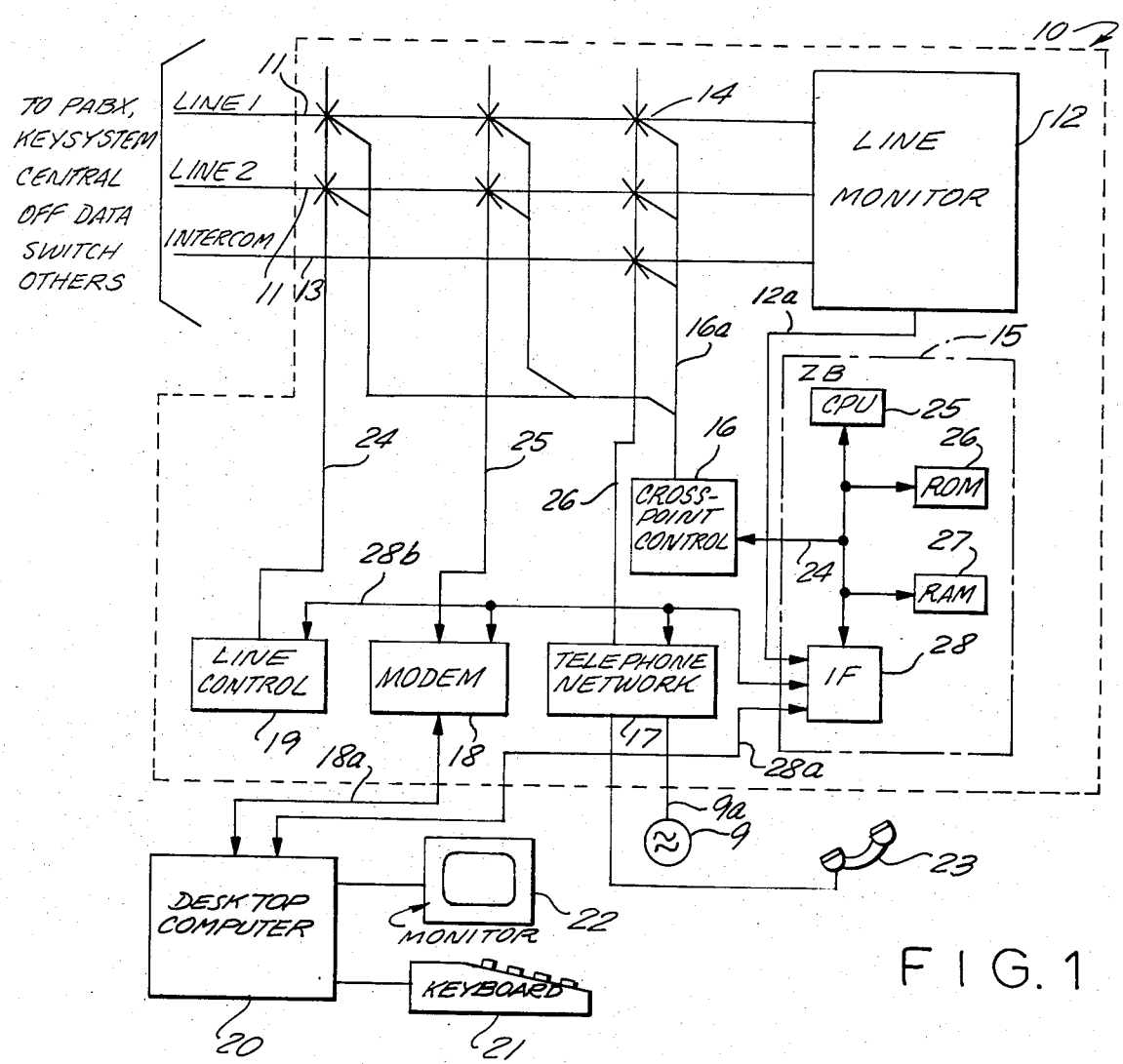
FIG. 1 is a schematic block diagram of the communications unit, showing the principal functional elements.

In FIG. 1, a number of communications lines are represented by line 1, line 2 and an intercom line having reference numbers 11 for the lines 1 and 2 and 13 for the intercom line, respectively. The number of lines 11 need not be two, it can be more than two, or it may be one line, but for the contemplated use, the use of two lines is considered typical. The lines 11 may be voice lines or voice and data lines, or one can be a data line and the other one a voice line. In the contemplated use a voice line meets generally the criteria for a line having a frequency range of typically from 300 to 3500 Hz. A data line may have the same bandwidth as a voice line, but may in addition have better controlled transmission parameters, such as crosstalk, phase distortion, envelope delay distortion, noise and so forth as generally required for data lines operating at data speeds above 2400 bits per second.

The lines 11 and 13 typically consist of two conductors, normally designated Tip and Ring, wherein the tip side is returned to ground potential at the external switching location, and the ring side is typically referred to −48 volt transmission battery. The switching location may be a central office or a PABX for the lines 11, or may be a typical keytelephone system of any one of a number of types of systems. In the contemplated use of the invention, the switching location is typically a keytelephone system which may be serving also other keytelephones or work stations. When used within a keytelephone system, each line 11, typically comprises, besides the tip and ring conductor for voice transmission, a so-called A-lead, which serves to place the line on hold when a momentary ground is connected to the A-lead at the work station. Another line "LAMP" or "L" is connected to a status ground-returned lamp for that line at the work station. If the line status is "idle", i.e., the line is not in use, the lamp will be dark. If the line is "engaged" in a conversation, it will be constantly "on". If the line is ringing, the lamp will be flashing at a rate of 60 interruptions per minute (60 IPM), and if the line is in a "hold" condition, the lamp will be "winking" at 60 IPM, i.e., the lamp is on longer than off interrupted briefly at a rate of 60 IPM.

The intercom line 13 typically consists of a tip and a ring conductor for voice transmission plus a signal line for audibly signalling ("buzzing") the line, or particular stations attached to the line, plus a lamp conductor, as described above. All lines 11 and 13 may have individual ground connections or a common ground for all lines.

The most commonly used method of data transmission on the lines 11 are by means of so-called modem data that are transmitted over a voice band using various modulation and demodulation principles that are well known and conventional. Modem data are typically transmitted at data speeds up to 9600 bits per second, and occasionally at higher speeds, but more often at lower speeds. The type of modulation and data speed used is immaterial to the scope of the present invention.

Returning now to FIG. 1, the three lines 11 and 13 enter the communications unit, shown in dashed line box 10, according to the teachings of the invention, from the left hand side, typically from a keytelephone system, as described above. The three lines 11 and 13 intersect three vertical lines 24, 25 and 26, and at each intersecting point an X, 14, indicates the presence of a so-called crosspoint, which is a component that selectively can interconnect the vertical and the horizontal line in typically a metallic connection. In the preferred embodiment, the crosspoint will consist of metallic make-contacts of a crosspoint to be energized from an electronic latching circuit such as a so-called S-R flip-flop, as shown in more detail in FIG. 3, and as described in more detail below. Crosspoints, in other embodiments of the invention, may be electronically constructed crosspoints combined with a latching circuit. Such electronic crosspoints are available as transistors FET's or SCR's from different manufacturers and have long been known and used. Each of the vertical lines 24, 25, and 26 is connected at the bottom of FIG. 1 to a separate function block, namely the line control 19, the modem 18 and the telephone network 17. The communications unit 10 also comprises a so-called microcomputer 15 which in the preferred embodiment is a so-called computer-on-a-chip. Such very small computers are available from a number of manufacturers such as Motorola, National Semiconductor, Zilog Corp. and others. The microcomputer contemplated in the preferred embodiment is a so-called 6803 from Motorola which comprises a Central Processing Unit (CPU) 25, a Read-Only Memory (ROM) 26, a Random Access Memory (RAM) 27 and an interface circuit (IF) 28. The above circuits are interconnected on the chip by means of a bus 24, which is also accessible from outside the chip 15.

A Line Monitor circuit 12 operates to monitor the status at all times of the lines 11 and 13, and "reports" the status to the microcomputer 15. A crosspoint control circuit 16 operates to control the setting and resetting of the individual crosspoint in response to instructions received from the microcomputer 15.

Figure 2:
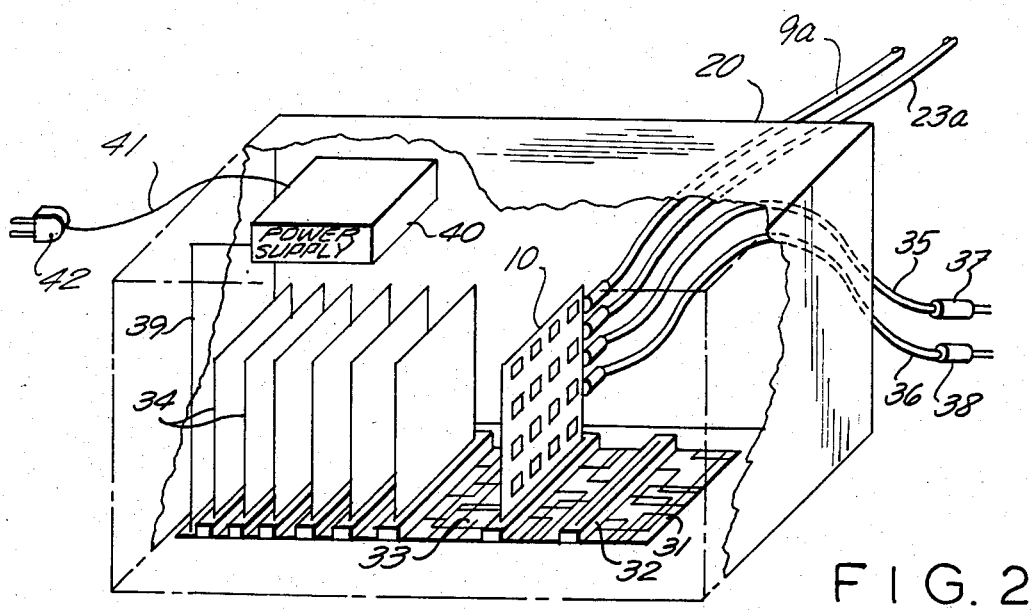
FIG. 2 is a perspective, diagrammatic view of a computer with the communications unit installed in the computer case.

The communications unit, according to the invention is, as stated above, shown in the dashed line box 10. In its physical realization, it is assembled on a single so-called printed circuit board which is equipped with a suitable card-edge connector for plugging into a prepared slot in a typical desktop type computer. Such an installation is shown in the perspective view of FIG. 2, wherein the housing 20 represents a desktop computer comprising a backplane 33 consisting of a number of card edge receptacle connectors 32, all mounted on a common frame 31 and wired together with backplane wiring generally at 33. The desktop computer 20 consists of, typically, a number of printed circuit boards 34, which contain all the various circuits required by the desktop computer 20, such as CPU, which is separate from the CPU 25 described above under the description of the microcomputer 15, and electronic memory circuits which store the computer's various operating programs and store intermediate data as required. The electronic circuit boards comprise interface circuits required to operate various peripheral systems that are part of the computer such as the monitor 22 with the CRT screen, the keyboard 21, and others, not shown, which are typically disk drive, printers and others. A power supply unit 40 also contained in the housing 20 is connected to the main AC power 42 and supplies power to all the circuit boards 34 via a power line 39, including the communications unit 10 according to the present invention. The communications unit 10 also has attached thereto two multiwire cables 35 and 36 each terminated in a plug 37 and 38, respectively. The cables 35 represents the two lines 11 of FIG. 1 and 36 represent the line 13. The plugs 37, 38 are advantageously of the so-called modular type now most commonly used for connection with a telephone network. The cables 35,36 exit from the housing 20 through suitable openings in the sides thereof. There are two other cables leaving the unit 10, namely, the cable 23a connected to the hand set 23 and a cable 9a connected to an audible buzzer 9, both seen on FIG. 1.

The desktop computer 20 may be any one of a number of such computers that are now commercially available from a number of manufacturers. Some of the best known are IBM, Hewlett-Packard, Apple and many others. The details of the construction of the computer 20 is immaterial to the scope of the present invention, as long as the chosen computer has prepared slots 32 in the backplane that are available for a so-called universal board. An IBM personal computer has been used successfully in a practical realization of the invention.

Referring again to FIG. 1, the individual circuit blocks constituting the communications unit 10, mentioned briefly above, will be described in more detail referring also to FIG. 3.

The microcomputer 15, which is a 6803-type "computer-on-a-chip" manufactured by Motorola contains the control programs stored in the ROM 26 which is part of the chip. The control programs are listings of binary encoded instructions. Each one of these instructions represent a unitary step to be performed by the communications unit 10.

Use of stored programs for undertaking complex control functions is now a widely used and well known art. The construction of microcomputer systems and control programs are described in textbooks, such as Microcomputer-Based Design by J. B. Peatman, ISBN 0-07-049138-0, published by McGraw-Hill and Computer Organization and Programming by C. W. Gear, ISBN 0-07-023076-5, also published by McGraw-Hill, and others which need not be described in detail here, since they are readily available.

The CPU 25 is capable of reading the instructions of the control programs one at a time and executing the instructions at a very high speed. Some of the instructions or strings of instructions require that certain data be stored temporarily for later use. Such temporary storage is provided by the Random Access Memory (RAM) 27. Other instructions result in commands to be performed outside the microcomputer 15, such as the setting and clearing of crosspoints 14 and others. Such commands are transmitted either directly from the CPU bus 24 or an interface circuit (IF) 28. Other instructions require that the CPU obtain information and data from other parts of the communications unit 10, and such information is typically transmitted via the IF circuit 28.

Figure 5:
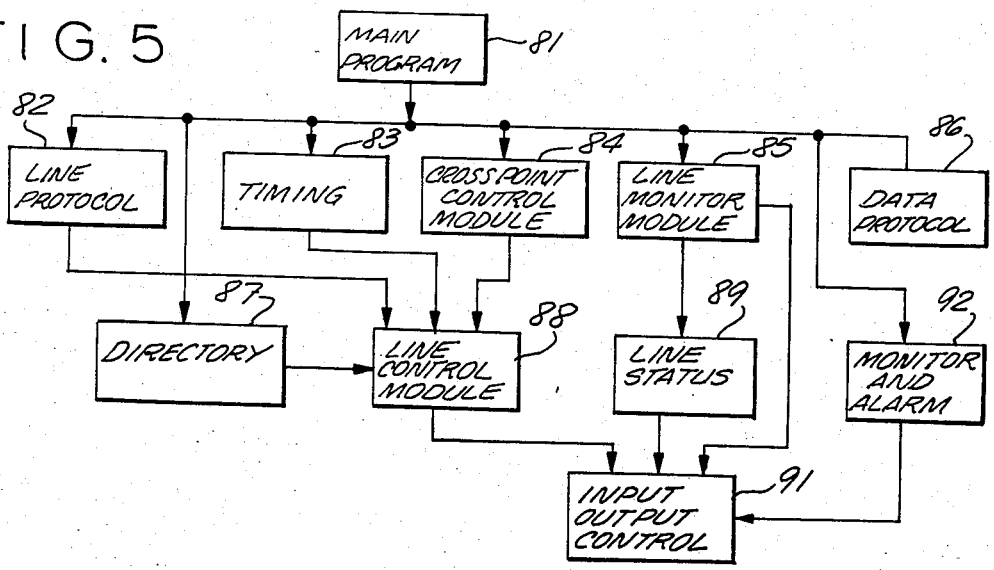
FIG. 5 shows the principal control program modules.

The control programs typically consist of smaller sections, called modules, wherein each module serves to perform a smaller, well-defined task within the entire program. FIG. 5 shows the organization of the control program and its individual major modules.

In FIG. 5, a main program module 81 maintains the main control of the remaining program modules and schedules all operations of the remaining modules. A line protocol module 82 contains the procedure of operating the individual lines 11, 13. A timing module generates all timing functions required within the control program, such as program interrupt, the line monitor function card, the monitor and alarm functions of module 92. The crosspoint control module 84 maintains the status of all crosspoints and their operation. The line monitor module 85 monitors the status of the individual lines 11, 12, as monitored by the line monitor 12 of FIG. 1. The data protocol module 86 is called in to insure the proper operation of the modem 18. The directory module 87 controls directory information and connection patterns as required by the user. The line control module 88 interacts with the line control circuit 19 in response to inputs from the directory module 87, the line protocol module 82, the timing module 83 and the crosspoint control module 84 to control the line control circuit 19. The line control module also interacts with input-output control module 91, which in turn controls the interface circuit 28. A line status module 89 maintains a record of the status of lines in response to the line monitor module 85, and in turn inputs to the input-output control module 91. The monitor and alarm module monitors the operation of the entire system and attempts to correct minor malfunctions. If unable to restore operation, it sends an alarm indication to the computer 20 for indication on the monitor 22. It should be understood that the entire control program consisting of the modules described in connection with FIG. 5 exists only as program instructions stored in the memory of the microcomputer 15, and that assistance may be provided from the control program stored in the computer 20. It should also be understood that the partitioning of the control program can be made by the designer of the program so that differently structured modules are produced.

The Interface Circuit 28 is connected by means of internal data busses 28a and 28b to the various blocks of the communications unit 10, and to the desktop computer 20, so that information and data may be exchanged through the bussses.

The Line Control circuit 19 may be connected with either one of the two lines 11 via the vertical line 24 and the associated crosspoints 14. The line control unit serves to access either line by being connected thereto through the appropriate crosspoint 14. A line is seized by placing a resistance bridge across the tip and ring conductor as shown in more detail in FIG. 3, wherein the line 11 is accessed by operating the crosspoint relay LA, 49, which in turn closes the crosspoint make contacts 46, 47 and 48. With make contacts 46 and 47 closed, a DC-connection may be established through the make contacts 58 of the relay PLS through the two balanced primary windings a and b of the transformer 57. When the line is seized, DC-current, supplied from the switching center, flows through the above described connection, and dial tone is supplied from the switching center. A connection may be established to a remote terminal by dialling the number of that terminal. The dialling is performed by pulses in the form of short current interruptions produced by the make contacts 58 of the relay PLS. The relay PLS is in turn controlled by the flip-flop 59 which is set and reset via set and reset leads connected to the interface circuit IF via the internal bus 28b (FIG. 1) and finally under control of the CPU 25 and the control program stored in the ROM 26. Control of the switching operation may alternatively be performed by means of the sending of dual-tones produced by the DTMF tone sender 61 in a manner analogous to the use of a conventional push button telephone. After a connection has been successfully established by the line control circuit 19, in the normal course of events, the line connection will be "handed over" to one of the other circuits, such as the modem 18, if an exchange of data is to be performed with another computer or to the telephone network circuit 17, if a speech connection is to be established. In the course of establishing the required connection by the line control circuit 19, various conditions such as normal busy tone, in the form of 60 IPM may be encountered, or a path—busy tone, 120 IPM, may be received, indicating that a temporary network congestion condition is encountered. Such tones may be received by the tone receiver 62 connected to the line 11 via the winding d of the transformer 57. The tone receiver 62 converts busy tones and other call progress tones to logic-level DC-signals that are transmitted via the bus 28b to the microcomputer's IF circuit 28 for interpretation. The microcomputer may, upon receiving such information, make a decision to wait and send again, or dial a different number depending upon instructions issued by the control program.

The tone receiver 62 may also have the capability of receiving DTMF tones, which are stated above, are the special double tone combinations selected as standard in the Western Electric Touch Tone ® system for tone signalling from push button telephones. Call progress tones, DTMF tones and other types of tones used in network signalling are described in books published by the AT&T company, such as "Notes on Long Distance Dialling", issued 1975 by AT&T. With the tone receiver 62 having DTMF tone receiving capability, the line control 19 can receive information in DTMF tones from a distant connected terminal and translate that information into a format that may be received by the microcomputer 15 or in turn by the desktop computer 20. The format conversion is advantageously performed by the interface circuit 28.

When the communications unit is operated in conjunction with a keytelephone system, as described above, there may be a need for placing one of the lines 11 in a hold condition. The relay HLD 60 performs this function by being momentarily operated by placing a ground from its make contact on the vertical lead 64, which, via the closed make contact 48 is transmitted via the A-lead to the keytelephone system's control unit, the so-called KSU which in turn places a holding bridge on the line 11. The hold condition, in accordance with conventional keytelephone practice, is memorized in a holding relay associated with the particular line 11, and allows the line control 19, or any other instrumentality connected to the line, to disconnect itself from the line without disturbing the hold condition, so that the line control 19, after being disconnected, may access another line in whichever way required under control of the microcomputer 15.

Briefly summarizing the operation of the line control 19, that circuit serves generally to dial up connections on any line connected to the communications unit and to monitor that line during the dialling up process, and to establish connection with the distant terminal connected to the line by means of tone sending and receiving "hand-shake" protocol used by the line and the terminal. The line control 19 is normally intended to stay with a line for the duration of such operations, and will normally again disconnect from the line when that service line has been performed, and will release the line to another user, which may be a voice telephone or a data set.

In a simplified embodiment of the invention, the line control functions, when they are uncomplicated, may be integrated by the other line users, such as the modem 18 or the telephone network 17.

Figure 3:
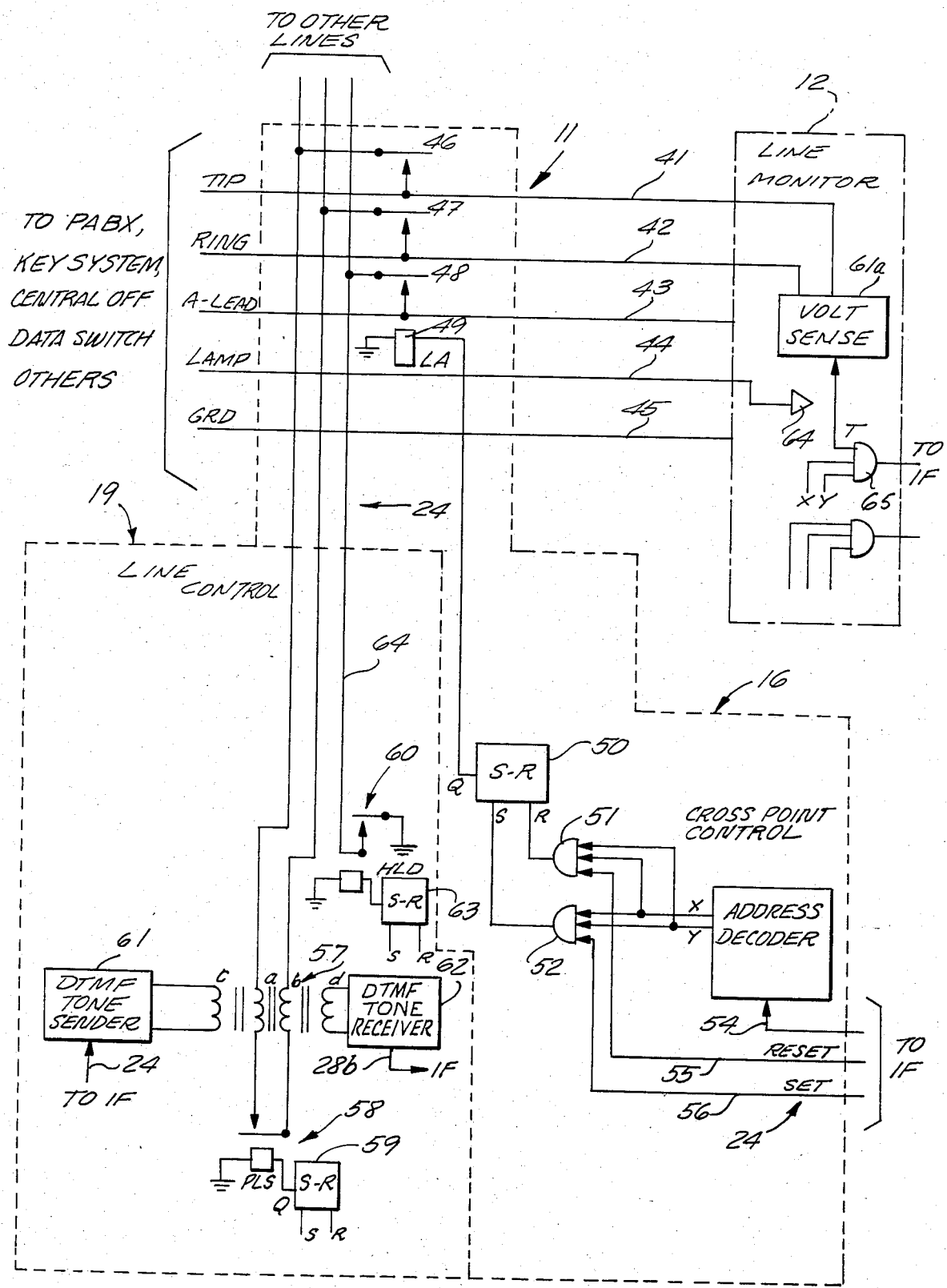
FIG. 3 is a partial simplified circuit diagram of the major components constituting the invention.

The crosspoint control circuit 16 consists of relays 49 and the associated flip-flops 50, seen in detail for a single crosspoint in FIG. 3 in the dashed line box 16. In FIG. 3, a single crosspoint between one of the horizontal lines 11 and the vertical lines 24 is seen consisting of three make contacts 46, 47 and 48 serving tip, ring and A-lead, respectively, under control of the coil of the relay LA, 49, (Line Access). The coil of LA 49 in turn is controlled by the SR flip-flop 50, having an output lead Q driving the relay coil, a set lead S and a reset lead R connected to the AND-gates 51 and 52, respectively, each having three inputs, of which the two top ones, X and Y are connected to an address decoder 53 which provides a two-lead address for any crosspoint. The bottom input is connected to a reset and a set lead respective from the interface circuit 28 of the microcmputer 15. In this way any crosspoint flip-flop 50 can be selected by the microcomputer and the control program by presenting an address to the IF 28 and a set or reset command 56 or 55, respectively. The flip-flop 50 maintains the relay LA 49 in its set or reset condition as required. This procedure for setting relays, crosspoints and any other devices is well known from computer technology and is conventional.

A line monitor circuit 12 operates to monitor the line status of any line 11 or 13 at all times. Line status conditions are typically line free, line ringing, line talking, line hold and others. In the event that a line is connected with a key system, the line status is indicated visually by the rate of the flashing of the line lamp under control of the LAMP lead 44. In machine communication, it is normally necessary for the machine to determine the line status by interpreting the rate of on and off condition of the LAMP lead 44. This interpretation is done in the microcomputer 15, via the interface IF 28 based on an output from an addressable AND gate 65, having two address inputs X, Y from an address decoder connected to the IF 28, and analogous to the address decoder 53 for the crosspoint control, and therefore not shown. An input to the amplifier 64 is connected to the lamp lead 44 and serves to convert the voltage level on the lamp lead to a level compatible with the AND-gate 65. In this way both or all the lamp leads 44 are scanned in rapid succession and their flashing rate determined, which in turn is translated into a line status.

In the event that a line 11 is not connected with a keytelephone system, the line status may be monitored by means of a voltage sensing element 61a having inputs connected to the tip and ring leads 41 and 42, and an output connected to addressable AND gate 65, which is in turn connected to the microcomputer 15 via the IF 28 for determining the line status on the basis of the voltage between tip and ring. Typically, a 48 volt (approximately) differential indicates an idle line status. A somewhat lower voltage indicates busy status, and ringing is indicated by the presence of AC-voltage of approximately 60–100 volts ac. The line voltage sensing element may advantageously be a so-called analog-to-digital converter which is available from several manufacturers and which produces a binary encoded representation of the input voltage which is directly readable by the microcomputer 15.

Figure 4:
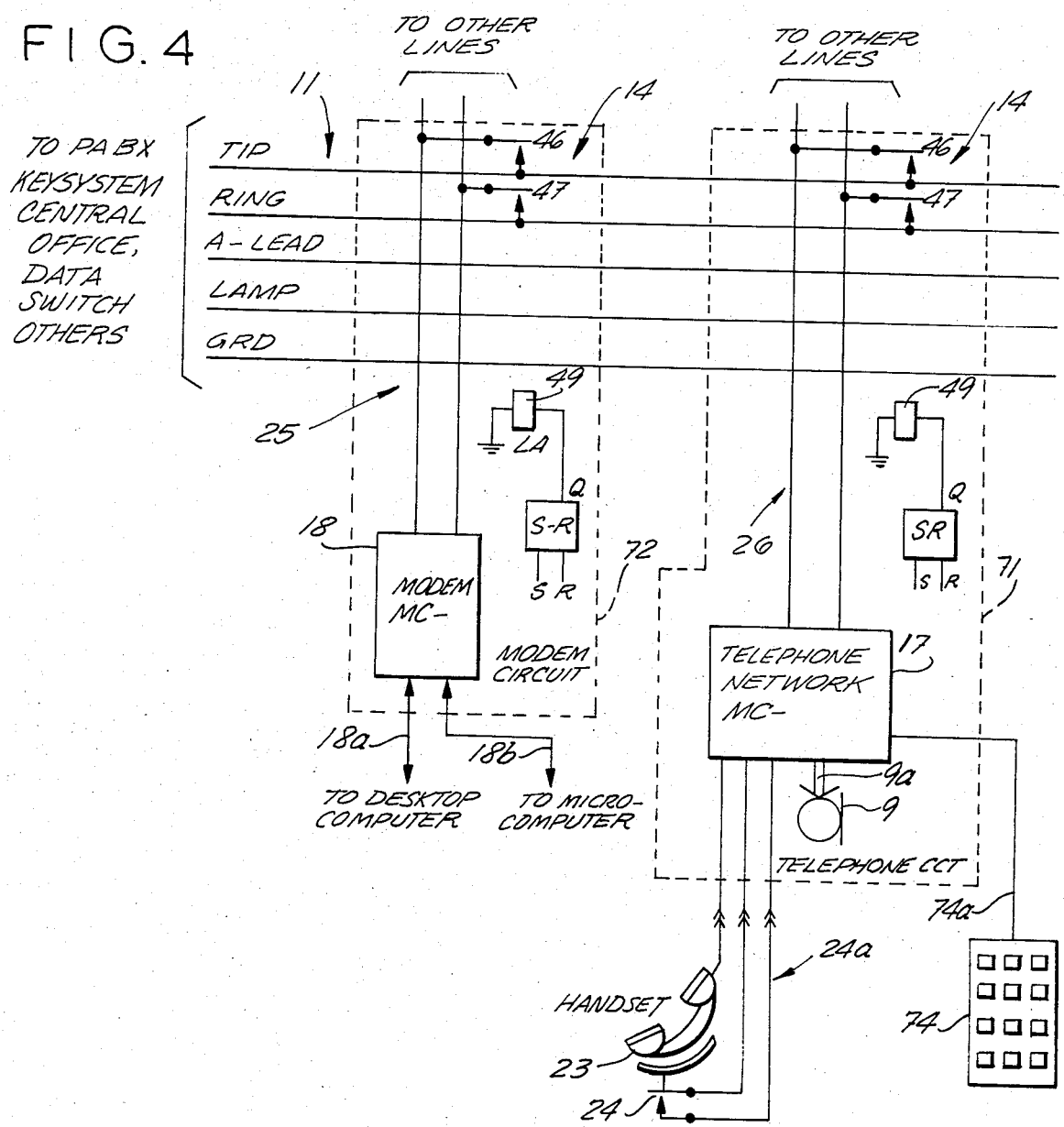
FIG. 4 is a partial circuit block diagram of the modem and telephone sections of the invention.

FIG. 4 shows two additional circuit sections of the communications unit, namely the modem section 72 and the telephone section 71. The modem section 72 includes the modem 18 and its crosspoint 14. The modem section 72 includes the modem 18 and its crosspoint 14 for connection with one of the lines 11. The crosspoint 14 consists, as described above, of the make contacts 46,47 for connection to the tip and ring, respectively, and the relay 49 and its associated flip-flop 50. The modem may be any one of a number of types available as an integrated circuit in a form that allows it to be directly installed on the printed wiring board 10. The modem 18 is connected directly to the desktop computer via the connection 18a which is typically part of the computer backplane wiring 33. The modem is also advantageously connected via the internal wiring 18b on the circuit board 10 to the microcomputer 15. In operation the modem 18 may communicate with the line in a number of forms. One such form is the so-called Frequency-Shift Modulation (FSK) which provides two-way full duplex data communication with a remote modem via the telephone line at moderate data speeds, by means of two frequency modulated carrier frequencies, one for each direction of transmission.

The telephone section 71 includes a telephone network 17, that can be connected via the vertical line 26 and the crosspoint 14, having make contacts 46 and 47 to the tip and ring of the line 11. It may be connected in the same manner to other lines, as seen in FIG. 1. The telephone network 17 is an integrated telephone circuit such as the MC 34010P from the Motorola Co. The telephone network provides the functions required by standard telephones, best known under various type numbers and standards established by the At&T Company. The telephone network provides the functions required in matching the standard handset with a standard carbon transmitter and a standard magnetic receiver with a standard telephone line of 600–900 ohm characteristic impedance. The network also provides so-called antisidetone suppression and protection against switching noises and other functions. The network chip provides terminations for a handset 23, and an off-hook switch 24 connected to the network via lead 24a. The off-hook switch is operated by the weight of the handset. A telephone ringer 9 is connected to the telephone network by the lead 9a. An optional tone keysender 74 is connected to the telephone network via leads 74a. The keysender 74 may be deleted and its function may be performed by the DTMF tone sender 61 described hereinbefore under the description of the Line Control 19 under control of the keyboard 21. In that case, the sending of telephone numbers is initiated from the keyboard 21 of the desktop computer 20.

Using the desktop computer's keyboard provides the advantage that direct access alpha-numeric keys allows the user to key-in numeric codes that are directly translated in the desktop computer's memory space into direct dialled telephone numbers that are transmitted over one of the lines 11 by means of the line control circuit 19, which is called into service for that purpose for the duration of time required to set up the connection.

As an example, if a user of the communications unit wishes to call a person known to him by his last name, the user merely keys into the desktop computer's keyboard the person's last name (instead of looking up that person's last name in a telephone directory), and the computer, in a translation table provided for that purpose, finds that person's number and possibly a group of numbers on which the person may be found.

That person may further have a special private number that must be dialled into a screening device before that person is alerted. Such private, or "unlisted" numbers may also be found in the aforesaid translation table. Furthermore, in order to reach the wanted person, the user may dial through a special telephone facility for long distance dialling or a private line network requiring special access codes and billing numbers. All such dialling procedures may be stored in the address translation table; so that a user of the communications unit need only key in with a few keystrokes the identity of the party the user wishes to reach. The process of establishing the connection may then be undertaken by the communications unit with the aid of the control programs stored in the computer memories.

The use of the desktop computer's keyboard has the additional advantage that lettered messages can be sent directly from the alpha-numeric keyboard 21. Such a message may be sent in ASCII (Acronym for American Standard Communications Information Interchange) code. The message must be sent to a terminal that is prepared to receive this code. The process of setting up such a connection will consist of the following steps:

1. The communications units user at the keyboard 21 keys in the desired destination code.

2. When the code is in and has been accepted by the desktop computer 20, the line control circuit 19 is activated to set up the connection as described above.

3. When the distant terminal is connected, it sends a confirmation tone, which will be recognized by the modem circuit 72 which, by this time has been connected to the same line 11.

4. When the modem receives the confirmation tone, also called receive tone, a corresponding answer tone called transmit tone is returned.

The two tones establish the fact that a complete connection is present. Data representing any type of message can now be exchanged between the two terminals, using FSK modulation on the two tone carriers in a well known conventional manner. During the message or data exchange, the line control circuit is released and the connection is held by the modem at each end while the line control circuit is free to establish other connections on other lines as required.

I claim:

1. A communications unit comprising a work station having a desktop computer, the desktop computer having an access opening for a printed circuit board, a keyboard and a monitor screen, the communications unit further including, mounted on said circuit board:
   a microcomputer;
   a switch matrix;
   a first plurality of horizontal lines included in the matrix; at least two external lines accessable by the horizontal lines;
   a second plurality of vertical lines accessable by the horizontal lines;
   a plurality of line monitors equal to said first plurality, each line monitor being operatively responsive to a respective horizontal line and each consisting of an analog-to-digital converter connected to the monitored line to sense the voltage on that line and convert that voltage to a digital signal, said converter operatively engaging an AND-gate addressable by said micro-computer to provide a digital indication of any status of the respective horizontal line in response to addressing by said microcomputer;
   a third plurality of selectively switchable crosspoints for selectively associating any horizontal line with any vertical line, said crosspoints selectively controllable by
   a crosspoint control circuit;
   said microcomputer controlling said crosspoint control circuit;
   a data modem responsively connected with a first one of said vertical lines for receiving and sending of data;
   a telephone network responsively connected with another one of said vertical lines, said telephone network connected with a telephone handset having a receiver and a transmitter for voice transmission; and
   means for connecting said communications unit with a desktop computer.

2. Communications unit as recited in claim 1, wherein said microcomputer comprises:
   a central processing unit for executing instructions in a control program;
   a read-only memory for storing control programs for controlling said communications unit;
   a random access memory for storing transient data;
   an interface circuit for operatively interfacing between said microcomputer and said modem, said telephone network, and said desktop computer.

3. A communications unit as recited in claim 2, wherein said horizontal lines and said vertical lines each comprise a tip and a ring conductor for voice transmission.

4. A communications unit as recited in claim 3 further comprising:
   a line control circuit associated with a third one of said vertical lines, said line control circuit being connectable to anyone of the horizontal lines;
   means included in the line control circuit being responsive to said microcomputer for closing the connection between said tip and ring lead of the third vertical line for seizing and for pulsing said third vertical line;
   a tone receiving circuit operatively associated with said third vertical line for receiving call progress tones and operatively associated with said microcomputer for transmitting call progress indications to said microcomputer.

5. Communications unit as recited in claim 4 further comprising a tone sender included in said line control circuit, said sender operatively responsive to said microcomputer for sending network control tones.

6. A communications unit as recited in claim 1 wherein at least one of said horizontal lines is connected with a keytelephone system having an A-lead and a lamp lead, said communications unit further comprising:
   means for engaging said A-lead associated with the keytelephone system for transmitting a hold condition to said line of the keytelephone system; and
   means for engaging said lamp lead associated with the keytelephone system for signalling line status from said keytelephone system to said line monitor circuit.

7. A communications circuit as recited in claim 1 wherein said access opening comprises:
   a circuit board connector associated with the backplane wiring of said desktop computer:
   a card edge connector on said printed circuit board for inserting said board into said circuit board connector for associating said communications unit with the backplane wiring of the computer.

8. A communications unit as recited in claim 1 wherein each of said crosspoints comprises:
   a crosspoint relay having:
   a latching circuit operatively responsive to said crosspoint control circuit for operating the crosspoint relay;
   at least two make contacts for connection to said horizontal lines.

9. A communications unit as recited in claim 8 and further comprising:
   an address decoder operatively responsive to the microcomputer interface circuit for producing address signals for said crosspoints:
   set and reset AND-gates responsive to the microcomputer for setting and resetting the latching circuits.

* * * * *